(12) United States Patent
Ehlinger

(10) Patent No.: US 7,447,193 B1
(45) Date of Patent: Nov. 4, 2008

(54) METHOD AND APPARATUS FOR ACCESSING A TELEPHONE NETWORK FROM THE INTERNET

(75) Inventor: James Ehlinger, Colts Neck, NJ (US)

(73) Assignee: AT&T Corp., New York, NY (US)

( * ) Notice: Subject to any disclaimer, the term of this patent is extended or adjusted under 35 U.S.C. 154(b) by 1087 days.

(21) Appl. No.: 10/740,041

(22) Filed: Dec. 18, 2003

Related U.S. Application Data

(63) Continuation of application No. 09/123,234, filed on Jul. 28, 1998, now Pat. No. 6,693,893.

(51) Int. Cl.
*H04L 12/66* (2006.01)

(52) U.S. Cl. .................... 370/352; 370/401

(58) Field of Classification Search ......... 370/351–358, 370/386, 389, 392, 401, 402, 395.5, 395.52
See application file for complete search history.

(56) References Cited

U.S. PATENT DOCUMENTS

| | | | | |
|---|---|---|---|---|
| 6,069,890 A | * | 5/2000 | White et al. | 370/352 |
| 6,144,667 A | * | 11/2000 | Doshi et al. | 370/401 |
| 6,157,648 A | * | 12/2000 | Voit et al. | 370/401 |
| 2001/0055299 A1 | * | 12/2001 | Kelly | 370/352 |

* cited by examiner

*Primary Examiner*—Brenda Pham

(57) ABSTRACT

A subscriber in communication with an IP network (12) such as the Internet, though a terminal (14) may launch an application on a Public Switched Telecommunications Network (PSTN) (16) by entering a data packet that takes the format of a telephone number that identifies the PSTN application. An IP gateway (22) couples the IP network (12) to the PSTN (16) and serves to recognize the data packet in the format of the PSTN application telephone number as well as translate the packet yield a stream of DTMF or other signals corresponding to the PSTN application telephone number. The IP gateway (22) then launches the stream of signals to dial the telephone number of the PSTN application. The gateway may also request information or control PSTN calls via the signaling/data channel between the gateway and the PSTN.

6 Claims, 1 Drawing Sheet

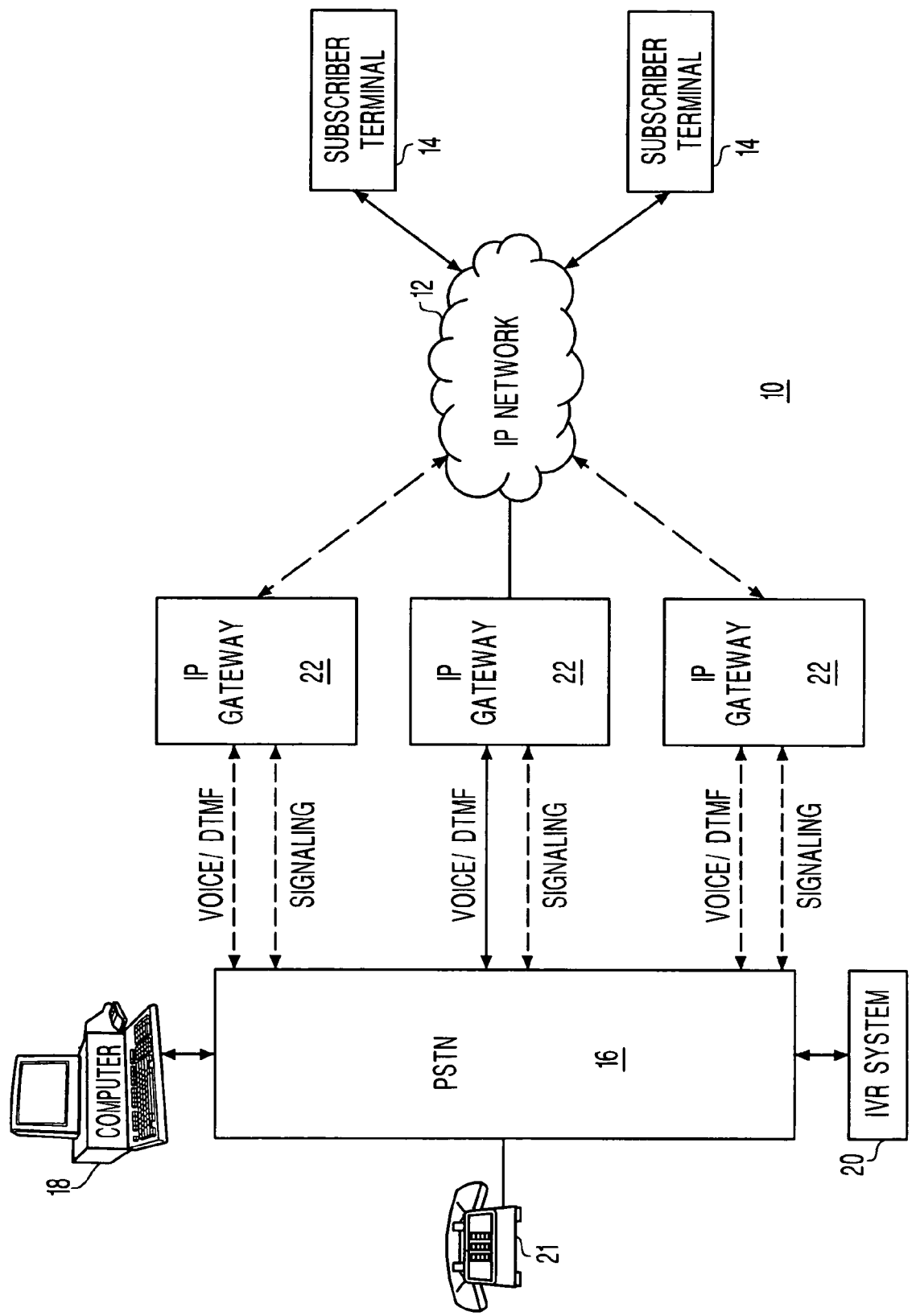

METHOD AND APPARATUS FOR ACCESSING A TELEPHONE NETWORK FROM THE INTERNET

CROSS-REFERENCE TO RELATED APPLICATION

This application is a continuation of U.S. application Ser. No. 09/123,234, filed Jul. 28, 1998 and now U.S. Pat. No. 6,693,893 as of Sep. 23, 2003.

TECHNICAL FIELD

This invention relates to a technique for allowing a subscriber presently in communication with an Internet Protocol (IP) network, such as the Internet, to access an application on the Public Switched Telecommunications Network (PSTN).

BACKGROUND ART

For many individuals, the Internet is an indispensable communications medium. Using the Internet, an individual can connect with thousands of separate sites that offer information, goods and/or services. Not only can an individual use the Internet to obtain information or to purchase products and/or services; the Internet can carry communications, in the form of electronic mail, between and among individuals anywhere in the world virtually instantaneously. A subscriber accessing the Internet establishes communication with a particular site by entering the corresponding Universal Resource Locator (URL). Thus for example, a subscriber on the Internet seeking access to the web site maintained by AT&T on the World-Wide Web would enter http://www.att.com. Other web sites are accessed by entry of corresponding URLs.

Rather than access a particular web site, a subscriber on the Internet or another IP network, such as a private Intranet, may wish to launch an application on the Public Switched Telephone Network. For example, a subscriber on the Internet may wish to communicate with a computer linked to the PSTN but not on the Internet. Alternatively, a subscriber on the Internet may need to access an Interactive Voice Response (IVR) system available only through the PSTN. In addition, a subscriber on the Internet may want to access information in the PSTN (such as a personal phone list or other personal information) and may want to set up a call on the PSTN under the control of the Internet. In both instances, no mechanism presently exists to allow a subscriber to directly access an application available exclusively on the PSTN via an IP protocol network, such as the Internet.

In general, present day IP protocol networks respond only to URLs. Thus, a subscriber who wishes to launch a particular application on the PSTN or wants to access PSTN information must first log-off the IP network and then establish a connection directly with the PSTN to access the desired information or application. Logging off the Internet and then establishing a new connection with a PSTN to launch a desired application is inconvenient. Moreover, a subscriber, once logged off the IP network, loses immediate access to services such as electronic mail and the like.

Thus, there is need for a technique for enabling a subscriber on an IP network, such as the Internet, to gain access directly through that network to the PSTN to launch an application on the PSTN or to obtain personal information in the PSTN.

BRIEF SUMMARY OF THE INVENTION

Briefly, in accordance with a preferred embodiment, the present invention provides a method for enabling a subscriber in communication through a terminal, such as a computer or the like, with an IP network, such as the Internet, to launch an application on the Public Switched Telecommunications Network (PSTN). Hereinafter, the term "launching an application on the PSTN" also includes the access of personal information on the PSTN. A subscriber initiates the method by entering through his or her terminal a data packet that takes the format of a telephone number or routing number identifying the desired application on the PSTN. The IP network communicates the data packet to a gateway platform connected to the PSTN. The gateway platform recognizes the data packet as telephone number of the desired application and thereafter translates the data packet into a stream of Dual-Tone-Multi-Frequency (DTMF) signals. The platform launches the DTMF signals to the PSTN to initiate the desired application. To the extent necessary for the subscriber to fully engage the PSTN application, the gateway platform performs all necessary translation of commands received from the subscriber's terminal into corresponding signals (either DTMF and/or voice) for passage to the PSTN. Likewise, the gateway terminal performs all necessary translation of signals (DTMF and/or voice) from the PSTN into IP commands for receipt on the subscriber's terminal. For information access, the Internet Gateway would launch a query through a signaling or data channel to the PSTN.

BRIEF DESCRIPTION OF THE DRAWING

FIG. 1 illustrates a block schematic diagram of a network for accessing an application on PSTN through a terminal on an IP network.

DETAILED DESCRIPTION

FIG. 1 illustrates a simplified schematic block diagram of a network combination 10 that includes an IP network 12, such as the Internet, or a private Intranet for example. The IP network 12 supports a plurality of terminals 14-14 (only two of which are shown), each terminal communicating with the network 12 via the Internet Protocol. For ease of illustration, the terminals 14-14 depicted in FIG. 1 enjoy a direct connection to the IP network 12. Alternatively, one or more terminals 14-14 could gain access to the IP network through a LAN or via a dial-up connection.

A subscriber in communication with the IP network 12 through a terminal 14 can establish a link to another terminal by entering the appropriate Universal Resource Locator (URL). The URL entered by the originating subscriber serves as the address for the destination terminal, thus permitting the IP network to route data between the originating and destination terminals. Unless the IP network 12 receives a URL in the proper format from an originating terminal 14, the network 12 can not establish a communications link between the originating terminal and a destination terminal.

In some instances, a subscriber at a terminal 14 may wish to launch an application on a Public Switched Telephone Network 16, such as the PSTN network maintained by AT&T. For example, a subscriber at a terminal 14 in communication with the IP network 12 may wish to communicate with a computer 18 linked to the PSTN but not linked to the IP network 12. Alternatively, the subscriber at a terminal on the IP network 12 may wish access data on an Interactive Voice Response (IVR) system 18 accessible only through the PSTN. Further, the subscriber at a terminal 14 may wish to communicate with a telephone set 21 connected to the PSTN. Invariably, applications on the PSTN 16, such as those discussed above, are accessed by entering the associated seven or ten-digit telephone number associated with the particular application. Heretofore, a subscriber in communication with the IP network 12 could not launch an application on the PSTN 16 simply by entering the telephone number of that application because the telephone number did not constitute an appropriate URL. Consequently, a subscriber in communication with the IP network 12 through a terminal 14 had to first log off the IP network and then establish a separate communications link with the PSTN 16. Moreover, a subscriber, once logged off the IP network 12, would lose access to services such as electronic mail and the like.

The present invention overcomes the foregoing disadvantages by enabling a subscriber in communication with the IP network 12 to launch an application on the PSTN simply by entering the telephone number of that application. To facilitate the launching of a PSTN application from one or more of the terminals 14-14, the network 10 includes an IP gateway 22 linking the IP network and the PSTN 16. The gateway 22 includes a switch (not shown) as well as means for coding and encoding voice signals (not shown), as well as a packet processor for building and extracting (i.e., packing and unpacking) packets for transmission to, and receipt from, the Internet 14. Other elements of the platform 16 include an echo canceller, a telephone signaling interface and a control processor for managing the platform. In practice, the platform 22 typically includes the elements of the Internet-Savvy (IS) platform disclosed in U.S. patent application Ser. No. 08/494,610, "Method and Apparatus for Establishing Voice Connections Over Internet-like Networks," filed on Jul. 23, 1995, in the name of Daniel J. Mayer, and assigned to AT&T (herein incorporated by reference.) The IP Gateway not only includes a voice/DTMF link with the PSTN, but also includes a signaling/data channel that enables the Gateway to query PSTN data resources and invoke controls for call management.

In operation, a subscriber desirous of launching an application on the PSTN 16 via a terminal 14 enters the telephone number (e.g., seven or ten digits) of that application via the subscriber's terminal 14. The telephone number of the PSTN application, by itself, would ordinarily mean nothing because it does not represent a URL to facilitate recognition of another terminal. However, in accordance with the invention, the IP network 12, upon receipt of a data packet from a terminal 14 corresponding to a seven or ten-digit telephone number, will pass that packet on to the IP gateway 22. The gateway 22 will recognize the seven or ten-digit packet as the identifying telephone number of a desired PSTN application and will translate the packet into a sequence of Dual-Tone Multi-Frequency signals comprising the telephone number of the desired PSTN application. Thereafter, the gateway 22 launches the DTMF signals to the PSTN to dial the number of the desired PSTN application. For example, the sequence of DTMF signals could represent the telephone number of the computer 18 or the IVR platform 20. If the request from the subscriber terminal is for access to the PSTN resources, the gateway will translate the request to a query or control message to the PSTN.

After launching the sequence of DTMF digits to dial the telephone number of the desired PSTN application, the IP gateway 22 additionally provides any conversion of DTMF signals, control signals, and/or as voice commands from the PSTN 16 into Internet Protocol for transmission to the subscriber in communication with the IP network though the terminal 14. By the same token, the gateway 22 will also convert data packets in an IP format to DTMF signals and/or voice, as required by the application dialed on the PSTN 16. In this way, the subscriber can access a desired application on the PSTN 16, yet remain connected to the IP network 12 and receive services therefrom. The IP gateway 22 has sufficient intelligence to recognize when the connection through the PSTN 16 is made to a voice system (e.g., IVR system 20) versus a modem (e.g., computer 18) and to provide for appropriate capture of voice information, such as via a .wav file. An example of this is the retrieval of a voice-mail message.

In the embodiment illustrated in FIG. 1, only one gateway 22 is depicted in solid. In practice, the network 10 could include several gateways, (shown in phantom), each connected to a different segment of the PSTN, and in particular, to a different telephone carrier, such as a different domestic local exchange carrier, or international carrier. Each IP gateway 22 could respond data packets that represent a PSTN application associated with a telephone number having a particular area code. Thus, for example, a data packet received at a particular IP gateway 22 will be converted into the corresponding sequence of DTMF signals to launch a call directed to a local exchange carrier, rather than an inter-exchange carrier. In this way, a subscriber could launch a PSTN application without necessarily accessing an inter-exchange carrier network, which might be especially useful for international communications.

The foregoing discloses a technique for enabling a subscriber in communication with an IP network 12 through a terminal 14 to launch an application on the PSTN 16 by entering a data packet taking the format of the telephone number of the PSTN application.

It is to be understood that the above-described embodiments are merely illustrative of the principles of the invention. Various modifications and changes may be made thereto by those skilled in the art, which will embody the principles of the invention and fall within the spirit and scope thereof.

What is claimed is:

1. A method for enabling a subscriber in communications through a terminal with an IP network to launch from the terminal an application of interest on a Public Switched Telecommunications Network (PSTN), comprising the steps of:

receiving in an IP network a data packet in the format of a telephone number that identifies the application of interest on the PSTN;

communicating the data packet to an IP gateway in communication with the PSTN;

recognizing the data packet at the IP gateway, determining at the gateway whether the application launched on the PSTN is a voice application and, if so, translating the data packet into a stream of signals corresponding to the telephone number identifying the application of interest on the PSTN;

launching the stream of signals to the PSTN to dial the telephone number of the application of interests;

receiving, from the subscriber, additional data packets; and translating each said additional data packet into a voice transmitting command.

2. The method according to claim 1 further including the steps of:

receiving at the IP gateway a voice command generated during the PSTN application; and converting the voice command into a .wav for receipt by the subscriber.

3. The method according to claim 1 including the step of determining at the IP gateway whether the application launched on the PSTN is a modem application.

4. The method according to claim 3 further including the steps of
    translating each additional data packet into an analog signal for receipt by a modem.
5. The method according to claim 4 including the steps of:
    receiving at the IP gateway analog signals generated during said PSTN application; and
    translating said analog signals into data packets having an Internet Protocol.

6. The method according to claim 1 wherein the gateway signals the PSTN via one of an information request and a control request under the control of the input from the subscriber terminal and sent to the IP Gateway which in turn accesses the PSTN for information retrieval or call control.

* * * * *